United States Patent [19]

Ishida et al.

[11] Patent Number: 5,625,949

[45] Date of Patent: May 6, 1997

[54] METHOD OF SECURING KNOBS ON LEVERS

[75] Inventors: Kiyonori Ishida; Tomotaka Orita, both of Hirakata; Toshiyuki Hanada, Yao; Yasuyuki Sakamoto, Daito; Kazunori Shimoyama, Ikoma; Masanori Mizutani, Hirakata; Fumio Orito; Shigeru Ogaya, both of Osaka, all of Japan

[73] Assignees: Matsushita Electric Industrial Co., Ltd., Osaka-fu; Katani Sangyo Co., Ltd., Ishikawa; Seidensha Electronics Co., Ltd., Tokyo, all of Japan

[21] Appl. No.: 378,442

[22] Filed: Jan. 25, 1995

[30] Foreign Application Priority Data

Jan. 26, 1994 [JP] Japan ..................... 6-007051

[51] Int. Cl.$^6$ ............................................. B21D 53/38
[52] U.S. Cl. .................. 29/896.5; 29/505; 29/509; 29/521; 403/282
[58] Field of Search ..................... 29/896.5, 505, 29/509, 521; 264/442; 403/274, 282

[56] References Cited

U.S. PATENT DOCUMENTS

| | | | |
|---|---|---|---|
| 1,797,691 | 3/1931 | Merrill | 403/274 |
| 2,298,858 | 10/1942 | Creager | 403/282 |
| 3,055,100 | 9/1962 | Kimpel | 403/282 |
| 4,928,375 | 5/1990 | Hadaway | 29/509 |

FOREIGN PATENT DOCUMENTS 99702  4/1925  Germany ..................... 403/274

*Primary Examiner*—P. W. Echols
*Attorney, Agent, or Firm*—Wenderoth, Lind & Ponack

[57] ABSTRACT

A method of securing to an operating lever in the form of an elongated metal plate an operating button made of thermoplastic resin and including a mounting tongue of a generally tubular configuration having a hollow defined therein. An anchor perforation and a stopper pawl are first formed in the operating lever and the operating button is then temporarily mounted on the operating lever with the operating lever slid into the hollow of the mounting tongue until an abutment defined in the mounting tongue and positioned within the hollow is brought into engagement with the stopper pawl. While the operating button is thus temporarily mounted on the operating lever, the operating lever is placed on a support bench with one of opposite surfaces of the operating lever held in contact with the support bench, and a pressure is subsequently applied to an area of the mounting tongue which is substantially aligned with the anchor perforation by means of a presser to thereby form an anchor peg protruding into the anchor perforation in the operating lever.

22 Claims, 3 Drawing Sheets

METHOD OF SECURING KNOBS ON LEVERS

BACKGROUND OF THE INVENTION

1. Field of the Invention

The present invention relates to a method of fixedly mounting an operating button on an operating lever of an electrical device such as, for example, a tape cassette player.

2. Description of the Prior Art

When it comes to fixed mounting of an operating button on an operating lever of the tape cassette player, the operating button is generally slid onto the operating lever and is then fixed in position on the operating lever by the use of a bonding agent. This will now be more specifically discussed with reference to FIG. 5 of the accompanying drawings.

In FIG. 5, reference numeral 50 represents, for example, a lever-operated mechanism. This lever-operated mechanism includes an operating lever 51 protruding outwardly therefrom and supported for movement between projected and retracted positions. The operating lever 51 has an anchor perforation 52 defined therein and also has its free end bent to define an upright stop. An operating button 53 to be fixedly mounted on the operating lever 51 is formed integrally with an elongated pawl 54 protruding outwardly therefrom and adapted to be trapped within the anchor perforation 52 in the operating lever 51 when the operating button 53 has been slid a predetermined distance onto the operating lever 51. After the operating button 53 has been mounted on the operating lever 51 by sliding it onto the latter, a bonding agent is deposited at 55 to connect an appropriate portion of the elongated pawl 54 firmly with the operating lever 51 so that the operating button 53 will not separate from the operating lever 51 unless the bond deposit 55 are removed.

The prior art mounting method discussed with reference to FIG. 5 however has a problem in that the assembly including the operating button fixedly mounted on the operating lever must be allowed to stand or be stocked for a substantial length of time before the bond deposit 55 is completely cured.

In addition, another problem is often found that the bonding agent may be inadvertently deposited on that portion of the operating lever 51 which moves in and out relative to the mechanism 50. The bond deposit on that portion of the operating lever 51 does in no doubt constitute an obstruction to a smooth movement of the operating lever 51 between the projected and retracted positions and, hence, a cause of malfunction of the operating lever 51.

SUMMARY OF THE INVENTION

Accordingly, the present invention has been devised to substantially eliminate the above discussed problems inherent in the prior art method of fixedly mounting an operating button on an operating lever of an electrical device or the like and is intended to provide an improved mounting method which substantially eliminates the need to stock the assembly before the bond deposit is completely cured and which is effectively and reliably practiced with no possibility of the bond deposit formed on any portion of the electrical device other than the intended portion thereof.

To this end, the present invention provides a method of securing to an operating lever in the form of an elongated metal plate an operating button made of thermoplastic resin and including a mounting tongue of a generally tubular configuration having a hollow defined therein. This method is practiced by forming an anchor perforation and a stopper pawl in said operating lever and temporarily mounting the operating button on the operating lever with said operating lever slid into the hollow of the mounting tongue until an abutment defined in the mounting tongue and positioned within the hollow is brought into engagement with the stopper pawl. While the operating button is thus temporarily mounted on the operating lever, the operating lever is placed on a support bench with one of opposite surfaces of said operating lever held in contact with the support bench, and a pressure is subsequently applied to an area of the mounting tongue which is substantially aligned with the anchor perforation by means of a presser to thereby form an anchor peg protruding into the anchor perforation in the operating lever.

Preferably, the presser is in the form of a generally cylindrical horn having a free end shaped to represent a generally semispherical shape.

Also preferably, the area of the mounting tongue to which the pressure is applied is defined at a location substantially aligned with the anchor perforation, but offset a predetermined distance towards a free end of the operating lever and wherein said presser is, during the application of the pressure, vibrated at a high frequency and a minute amplitude. This high frequency and the minute amplitude may be not higher than 20 kHz and not greater than 15 μm, respectively.

During the application of the pressure to the area of the mounting tongue the other of the opposite surfaces of the operating lever is held in contact with a surface region of the mounting tongue aligned with that area to which the pressure is applied and, at the same time, the operating button is retained by a backup element in position as temporarily mounted on the operating lever with the abutment held in engagement with the stopper pawl. Preferably, the stopper pawl in the operating lever is formed by raising a corresponding lug protruding into the anchor perforation from an edge remote from the free end of the operating lever so as to extend at right angles to the operating lever, wherein said support bench has a shaping weir formed thereon and adapted to protrude into the anchor perforation when the operating button is mounted on the operating lever, and wherein said anchor peg is formed between the shaping weir on the support bench and an edge opposite to that edge at which the stopper pawl is formed.

The anchor peg can be of a size determined by the pressure applied from the presser and the length of time of application of the pressure with no stopper provided forcibly in the direction of application of the pulsating pressure during the application thereof to the area of the mounting tongue.

According to the present invention, the operating lever can be instantaneously fixedly mounted on the operating lever since, subsequent to mounting of the operating button on the operating lever with the latter slid into the hollow in the mounting tongue until the stopper pawls are brought into engagement with the abutment edge and the abutment, respectively, the area of the top wall of the mounting tongue is pressed to form the anchor peg engaged in the anchor perforation in the operating lever. As compared with the prior art mounting method, no adhesive material is employed. Therefore, not only is there no need to stock the assembly before the bond deposit is completely cured, but the method of the present invention is effective to provide the reliable and high-quality assembly substantially free from any possible trouble which would otherwise be caused by the bond deposit formed in the wrong position and also to increase the productivity.

Formation of the anchor peg protruding from the area of the top wall of the mounting tongue inwardly into the hollow and then into the anchor perforation in the operating lever is easily accomplished because the presser is vibrated when it is brought in position to press that area in the mounting tongue. Also, since the area in the mounting tongue is defined at the location generally aligned with the associated anchor perforation, but offset a slight distance towards the stopper edge confronting such anchor perforation as hereinbefore described, a substantial amount of the resin component forming the anchor peg is biased towards the stopper edge 3a confronting the anchor perforation, thereby allowing the resultant anchor peg to assuredly avoid any possible play of the operating button 6 relative to the operating lever.

When the pulsating force is to be applied to the area of the top wall of the mounting tongue through the presser, a portion of the undersurface or inner surface of the top wall of the mounting tongue is held in contact with the operating lever while the latter is retained in position with the stopper pawls held into engagement with the abutment edge and the abutment, respectively. Therefore, not only is it effective to avoid any possible separation of the operating button from the operating lever during the application of the pulsating force from the presser to that area in the mounting tongue by the utilization of the high frequency vibration, but also the operating button can advantageously be secured in position on the operating lever.

The stopper pawl in the operating lever is formed by the use of any known press work by raising a corresponding lug protruding into the anchor perforation so as to erect at right angles to the operating lever and the stopper pawl in the operating lever is also formed by the use of any known press work by bending the free end of the operating lever at right angles to the remaining portion of the operating lever. On the other hand, the support bench used to support the player mechanism has the corresponding shaping weir which, when the operating button is mounted on the operating lever, confronts the stopper edge of the anchor perforation and which cooperates with the edge to define the anchor peg therebetween upon application of the pulsating pressure to that area of the top wall of the mounting tongue. Because of these reasons, it is possible to employ the anchor perforation of a relatively large size enough to facilitate the raise of the lug to form the stopper pawl and, at the same time, the anchor peg can assuredly be formed by the shaping weir then cooperating with the edge of the anchor perforation.

If the pulsating pressure of not higher than 20 kHz and an amplitude of not greater than 15 μm is applied to that area of the top wall of the mounting tongue through the presser, the resin component at that area of the top wall of the mounting tongue can be substantially half-fused to protrude that resin component in a direction conforming to the direction of application of the pulsating pressure and, therefore, the anchor peg can advantageously be formed. More specifically, application of the pressure not higher than 20 kHz and of an amplitude of not greater than 15 μm is effective to avoid such possibility that the resin component at that area of the top wall of the mounting tongue may be completely fused to such an extent that the fused resin component may subsequently flow in a direction counter to the direction of application of the pressure.

Also, if the amount of the resin component that protrudes into the space within the anchor perforation to eventually form the anchor peg is determined depending on the preset magnitude of the pulsating pressure and the length of time of application of such pulsating pressure with no stopper provided forcibly in the direction of application of the pulsating pressure during the application thereof to the area in the mounting tongue through the presser, the anchor peg can be formed to such a size as determined by the pressure applied from the presser and the length of time of application of the pulsating pressure through the presser. This is particularly advantageous when the operating lever is apt to deform and/or when that area of the top wall of the mounting tongue has a varying thickness.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which.

DETAILED DESCRIPTION OF THE EMBODIMENT

Figure 4:
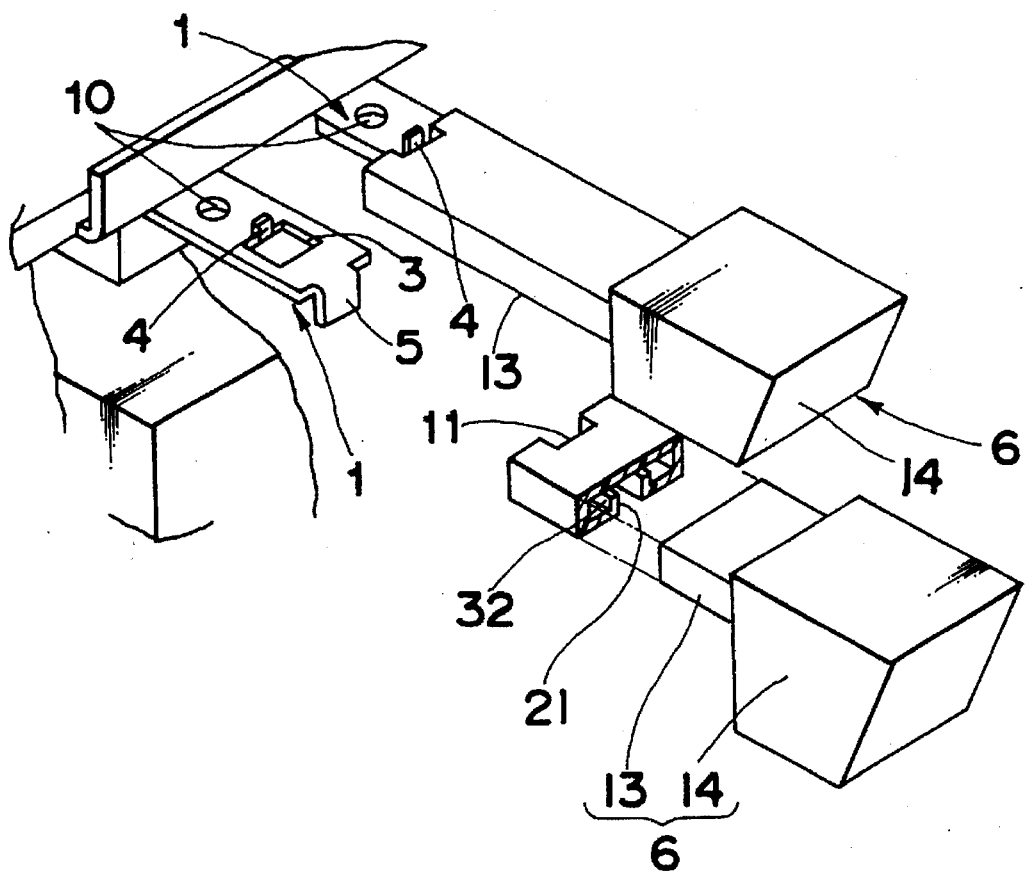
FIG. 4 is a perspective view, on an enlarged scale, of a portion of the player mechanism, showing two of the operating buttons mounted and ready to be mounted on the respective operating levers.
Figure 5:
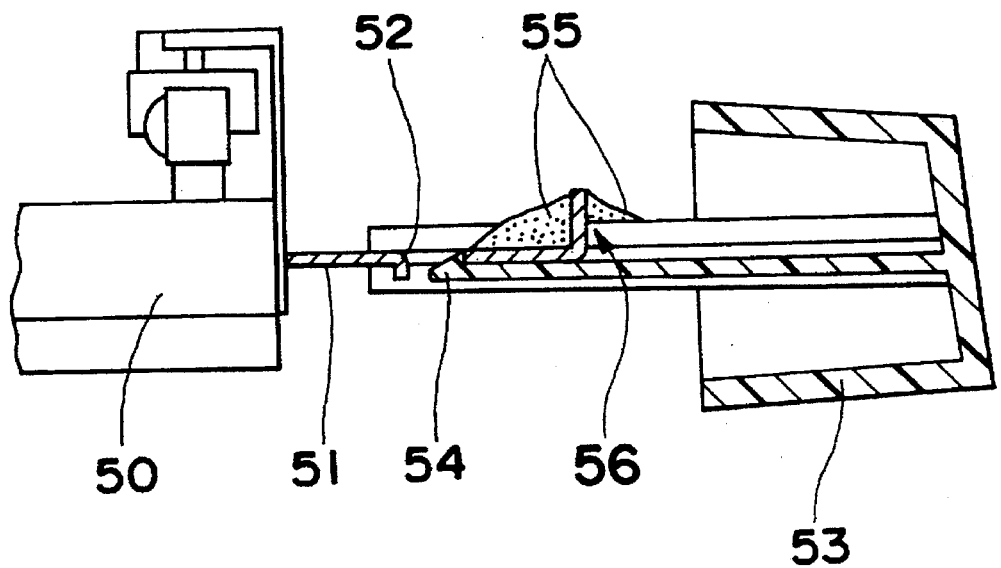
FIG. 5 is a fragmentary side sectional view of the operating button being mounted on the operating lever according to the prior art mounting method.

Referring first to FIG. 4, there is shown a cassette player mechanism 2 having a plurality of operating levers generally identified by 1 and operatively supported in side-by-side fashion. The cassette player mechanism 2 is also shown to include a drive motor 24, a flywheel 25 drivingly coupled with the drive motor 24, a chassis 26 for the support of the drive motor, the flywheel 25 and other component parts and mounting flanges 27. This cassette player mechanism 2 so far shown is well known to those skilled in the art and may be of any known construction. Therefore, no detail of those component parts of the mechanism 2 will be herein discussed for the sake of brevity in so far as the method of the present invention is directed to securement of operating buttons 6 to the respective operating levers 1.

The operating levers 1 are supported by the chassis 26 of the player mechanism 2 for movement between projected and retracted positions and are normally biased to assume the projected position by any suitable biasing means (not shown) such as, for example, spring elements. Each of these operating levers 1 is in the form of a generally oblong plate formed by any known metal press work. As best shown in FIG. 4, each operating lever 1 has a generally rectangular anchor perforation 3 and a generally round positioning hole 10 both defined therein and also has stopper pawls 4 and 5 integrally formed therewith by any suitable press work so as to protrude upwardly and downwardly relative to the plane of movement of the respective operating lever 1, respectively.

As clearly shown in FIGS. 1 to 4, the upwardly extending stopper pawl 4 in each operating lever 1 is bent upwardly from one of four side edges of the respective anchor perforation 3 adjacent to the associated positioning hole 10 while another one of the four side edges of the respective anchor perforation 3 opposite to such stopper pawl 4 is defined as a stopper edge 3a which will function as will be described later. The downwardly extending stopper pawl 5 in each operating lever 1 may be a free end, or a portion thereof, of such operating lever 1 that is bent downwardly.

Figure 3:
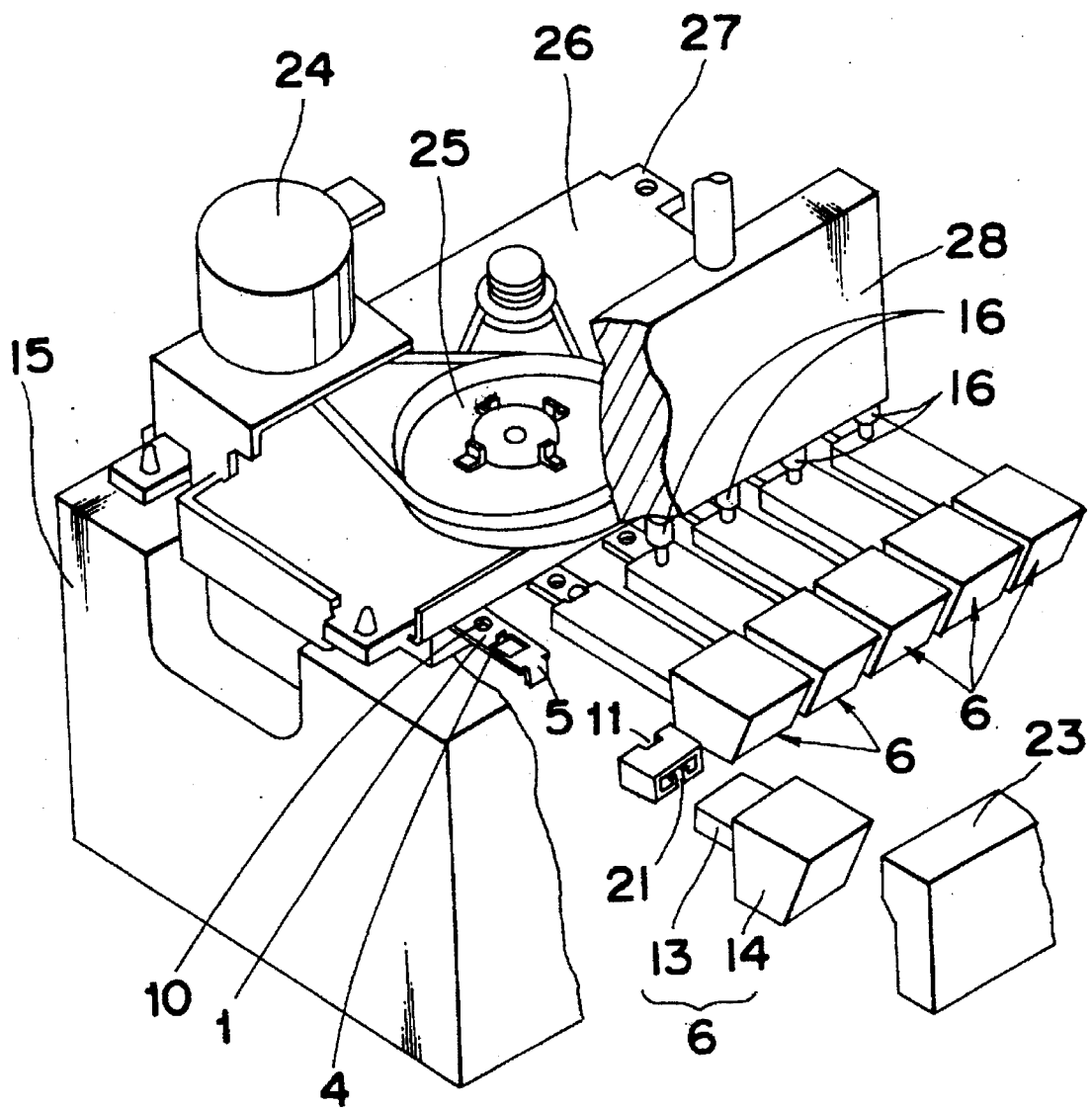
FIG. 3 is a fragmentary perspective view of a player mechanism having a plurality of operating levers onto which respective operating buttons are mounted according to the present invention.

Reference numeral 6 represents an operating button employed for each of the operating levers 1. This operating button 6 may be of one-piece construction made of thermoplastic resin and includes a shaped knob 14 and a generally rectangular-sectioned tubular mounting tongue 13 protruding in one direction from the shaped knob 14. The rectangular-sectioned tubular mounting tongue 13 of the respective operating button 6 has a hollow 7 defined therein of a size sufficient to loosely receive the associated operating lever 1 therein as will be described later and is delimited by top, bottom and side walls. As best shown in FIGS. 3 and 4, the bottom wall of the mounting tongue 13 has a slit 21 defined therein so as to extend inwardly from a free end thereof for passage therethrough of the stopper pawl 5 in the associated operating lever 1 and also has an abutment formed at 12 (FIG. 1) within the slit 21 for engagement with such stopper pawl 5.

It is to be noted that although the hollow 7 of the mounting tongue 13 may be of a size sufficient to allow the associated operating lever 1 to be press-fitted thereinto, the hollow 7 in the illustrated embodiment is of such a size as to allow respective inner surfaces of the top and bottom walls of the mounting tongue 13 to be spaced a distance greater than the thickness of the associated operating lever 1. With the hollow 7 so oversized in the illustrated embodiment relative, to avoid a possible play of each operating button 6 relative to the associated operating lever 1, upright ribs 32 are integrally formed in the bottom wall of the mounting tongue 13 on respective sides of the slit 21 so as to protrude upwardly towards the top wall of the mounting tongue 13 to thereby leave between them and the inner surface of the top wall of the mounting tongue 13 clearances of a size substantially equal to the thickness of the associated operating lever 1.

It is also to be noted that although in the illustrated embodiment the slit 21 in the bottom wall of the mounting tongue 13 is shown to extend over the length of the mounting tongue 13, it may be formed so as to extend a distance generally required or desired to allow the associated operating lever 1 to protrude into the hollow 7 of the mounting tongue 13 and, in this case, the abutment 12 may be defined by an open edge of the bottom wall of the mounting tongue 13 confronting the slit.

A free end of the top wall of the mounting tongue 13 of each operating button 6 remote from the shaped knob 14 is formed with an axially inwardly extending recess 20 that leaves an abutment edge 11. This abutment edge 11 is engageable with the stopper pawl 4 of the associated operating lever 1 when and after consequent upon mounting of the operating button 6 on the associated operating lever 1 the stopper pawl 4 is received within the recess 20.

Figure 1:
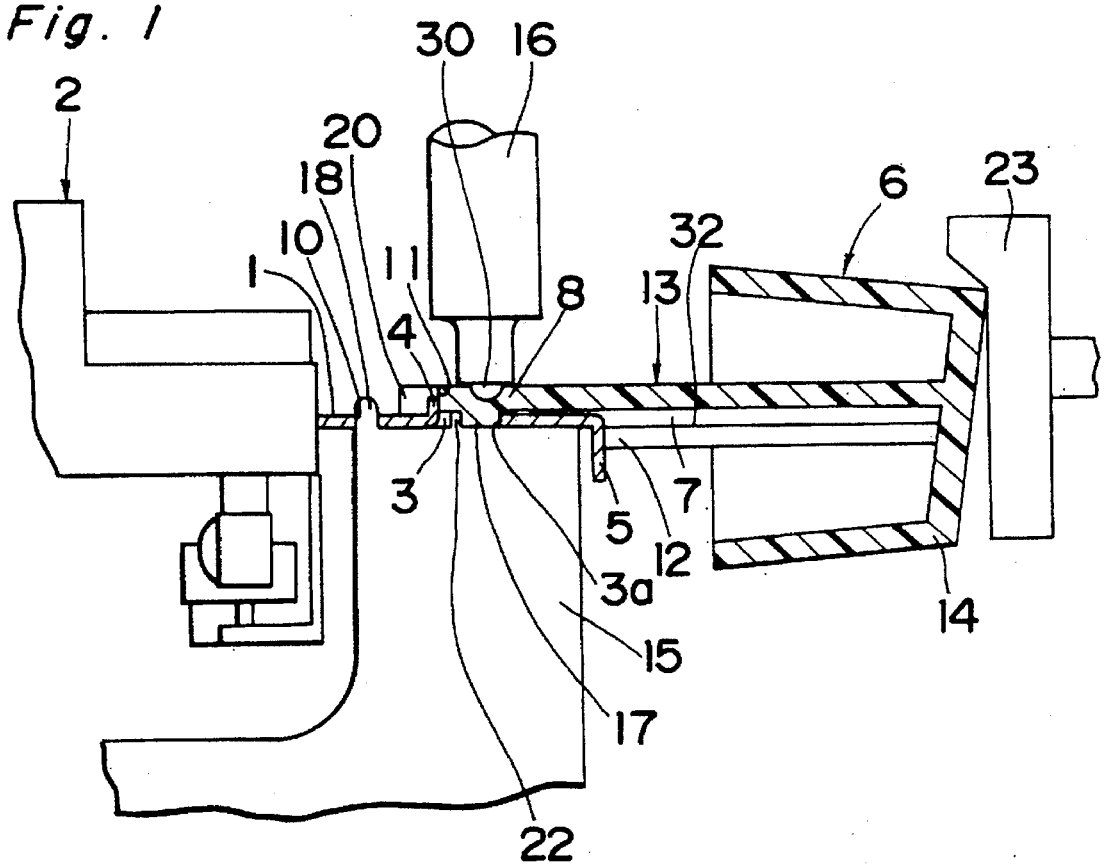
FIG. 1 is a fragmentary side sectional view of an operating button being mounted on an operating lever according to a mounting method of the present invention.
Figure 2:
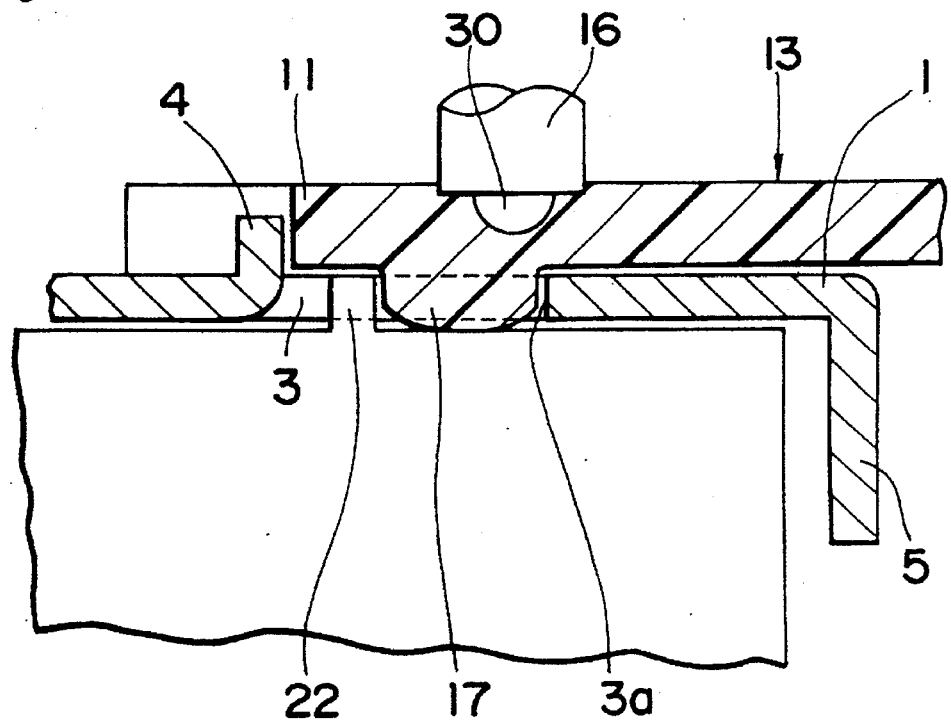
FIG. 2 is a side sectional view, on an enlarged scale, showing a portion of the assembly shown in FIG. 1.

In an assembled condition, each operating button 6 is fixedly coupled with the associated operating lever 1 with the latter slid into the hollow 7 in the mounting tongue 13 until the stopper pawls 4 and 5 are brought into engagement with the abutment edge 11 and the abutment 12, respectively. As will become clear from the subsequent description, this fixed coupling is accomplished by an area 8 of the top wall of the mounting tongue 13 that is depressed inwardly of the mounting tongue 13 to define an anchor peg 17 protruding into the anchor perforation 3 in the associated operating lever 1 as best shown in FIGS. 1 and 2.

While each operating lever 1 and the associated operating button 6 are so configured as hereinbefore described, the use is made of a support bench 15 in the practice of the mounting method of the present invention. As best shown in FIGS. 1 to 3, the support bench 15 has a mount surface for the support of the operating levers 1 from below, which surface is formed with a transverse row of positioning pins 18 engageable in the corresponding positioning holes 10 in the operating levers 1 when the player mechanism 2 is placed on the support bench 15. Thus, it will readily be understood that, when the player mechanism 2 is placed on the support bench 15 with the positioning pins 18 engaged in the corresponding anchor holes 10 in the respective operating levers 1, the operating levers 1 are substantially firmly retained in position ready to receive the associated operating buttons 6. The mounting surface of the support bench 15 is also formed with a transverse row of shaping weirs 22 of a width smaller than the width of the corresponding anchor perforation 3, each of said shaping weirs 22 being positioned so as to protrude into the corresponding anchor perforation 3, when the player mechanism 2 is placed on the support bench 15, so that the associated anchor peg 17 can be formed between the stopper edge 3a and the shaping weir 22 as best shown in FIG. 2 when the area 8 of the top wall of the mounting tongue 3 is inwardly depressed in a manner as will subsequently be described.

To avoid a possible separation of some or all of the operating buttons 6 from the associated operating levers 1 once the former have been temporarily mounted on the latter, i.e., during the practice of the mounting method of the present invention, a backup bar 23 is utilized to press the operating buttons 6 towards the associated operating levers 1.

In the practice of the present invention, the use is also made of pressers 16 supported by a carrier block 28 in a transverse row for movement up and down in a direction perpendicular to the operating levers 1. Each of the pressers 16 is in the form of a generally cylindrical metallic horn having a substantially semispherical tip 30 facing towards the corresponding operating lever 1. The number of the pressers 16 used may be chosen as desired in consideration with the number of the operating buttons 6 to be mounted on the associated operating levers 1. For example, although in the illustrated embodiment the number of the pressers 16 is equal to the number of the operating levers 1 or the operating buttons 6 as it is assumed that the whole number of the operating levers 1 requires the corresponding number of the operating buttons 6 to be mounted thereon, at least one presser 6 may serve the purpose either if only one operating lever 1 requires the corresponding operating lever 6 to be mounted thereon or if arrangement is made to allow the single presser 16 to intermittently move transversely from a position above one operating lever 1 to a different position above the next adjacent operating lever 1 to successively work on the plural operating levers 1. Therefore, each of the pressers 16 may be removable relative to the carrier block 28.

Each of the pressers 16 carried by the carrier block 28 is of a design operatively coupled with a suitable high frequency oscillator (not shown) so that, when the carrier block 28 is lowered to an operative position, as will be described later, the respective presser 16 undergoes vibration preferably at a frequency of not higher than 20 kHz and an amplitude of not greater than 15 μm to apply a pulsating force to the associated area 8 of the top wall of the corresponding mounting tongue 13.

In the illustrated embodiment, the carrier block 28 is so positioned with the pressers 16 aligned immediately above the respective operating levers 1 and, more specifically, immediately above the respective areas 8 of the top walls of the mounting tongues 13 of the operating buttons 6 then mounted on such respective operating levers 1. Assuming that each operating button 6 has been temporarily mounted on the respective operating lever 1, the area 8 of the top wall of the mounting tongue 13 of each operating button 6 where the semispherical tip 30 of the associated presser 16 contact when the carrier block 28 is lowered is defined, as best shown in FIGS. 1 and 2, at a location generally aligned with the associated anchor perforation 3, but offset a slight distance towards the stopper edge 3a confronting such anchor perforation 3.

Fixed coupling of each of the operating button 6 to the associated operating lever 1 will now be described. It is, however, to be noted that, since all of the operating buttons 6 shown as employed in the illustrated embodiments are secured to the respective operating levers 1 simultaneously, reference will be made to the fixture of only one of the operating buttons 6 to the associated operating lever 1 for the sake of brevity.

Assuming that the player mechanism 2 has been placed on the support bench 15 with the operating lever 1 resting on the support bench 15 and also with the positioning hole 10 aligned with the positioning pin 18 as shown in FIG. 1, the operating button 6 is temporarily mounted on the operating lever 1 with the latter slid into the hollow 7 of the mounting tongue 13 until the stopper pawls 14 and 15 are brought into engagement with the abutment edge 11 and the abutment 12, respectively, substantially as shown in a top area of FIG. 4. After the operating button 6 has been temporarily mounted on the operating lever 1, the backup bar 23 is brought in position to retain the operating button 1 to be temporarily mounted on the operating lever 1 to thereby avoid an unwanted separation of the temporarily mounted operating button 6 from the operating lever 1.

Thereafter, the carrier block 28 is lowered from above towards the mounting tongue 13 with the presser 8 pressing the area 8 in the mounting tongue 13. Since the presser 8 is then energized to undergo a pulsating motion, vibration applied to the area 8 in the mounting tongue 13 to allow a resin component at that area 8 to protrude into a space delimited within the anchor perforation 3 and between the shaping weir 22 and the stopper edge 3a as clearly shown in FIG. 2, thereby forming the anchor peg 17 engaged in the anchor perforation 3. After the formation of the anchor peg 17, the carrier block 28 is elevated and the backup bar 23 is retracted, thereby completing a cycle of fixed mounting of the operating button on the operating lever. During the elevation of the carrier block 28 subsequent to the fixture, separation of the presser 16 from the area 8 in the mounting tongue takes place smoothly without being caught or locked up in that area of the mounting tongue 13 because the tip 30 of the presser 16 is shaped to assume a semispherical shape as hereinbefore described.

It is to be noted that the backup bar 23 serves to avoid any possible separation of the operating button 6 from the operating lever 1 under the influence of the vibration during application of vibrations to the area 8 in the mounting tongue 13 through the presser 16 and also to avoid any possible axial displacement of the operating lever 1 after the fixture.

Thus, it will readily be understood that the operating button 6 is substantially fixed to the operating lever 1 with the anchor peg 17 engaged in the anchor perforation 3. The size of the anchor peg 17 so formed depends on the pressure applied from the presser 16 and the length of time of application of the pulsating force through the presser 16.

According to the foregoing preferred embodiment of the present invention, the operating lever 6 can be instantaneously fixedly mounted on the operating lever 1 since, subsequent to mounting of the operating button 6 on the operating lever 1 with the latter said into the hollow 7 in the mounting tongue 13 until the stopper pawls 14 and 15 are brought into engagement with the abutment edge 11 and the abutment 12, respectively, the area 8 of the top wall of the mounting tongue 13 is pressed to form the anchor peg 17 engaged in the anchor perforation 3 in the operating lever 1. As compared with the prior art mounting method, no adhesive material is employed. Therefore, not only is there no need to stock the assembly before the bond deposit is completely cured, but the method of the present invention is effective to provide the reliable and high-quality assembly substantially free from any possible trouble which would otherwise be caused by the bond deposit formed in the wrong position and also to increase the productivity.

Formation of the anchor peg 17 protruding from the area of the top wall of the mounting tongue 13 inwardly into the hollow 7 and then into the anchor perforation 3 in the operating lever 1 is easily accomplished because the presser 16 is vibrated when it is brought in position to press that area 8 in the mounting tongue 13. Also, since the area 8 in the mounting tongue 3 is defined at the location generally aligned with the associated anchor perforation 3, but offset a slight distance towards the stopper edge 3a confronting such anchor perforation 3 as hereinbefore described, a substantial amount of the resin component forming the anchor peg 17 is biased towards the stopper edge 3a confronting the anchor perforation 3, thereby allowing the resultant anchor peg 7 to assuredly avoid any possible play of the operating button 6 relative to the operating lever 1.

When the pulsating force is to be applied to the area 8 of the top wall of the mounting tongue 13 through the presser 16, a portion of the undersurface or inner surface of the top wall of the mounting tongue 13 is held in contact with the operating lever 1 while the latter is retained in position with the stopper pawls 14 and 15 held into engagement with the abutment edge 11 and the abutment 12, respectively. Therefore, not only is it effective to avoid any possible separation of the operating button 6 from the operating lever 1 during the application of the pulsating force from the presser 16 to that area 8 in the mounting tongue 13 by the utilization of the high frequency vibration, but also the operating button 6 can advantageously be secured in position on the operating lever 1.

The stopper pawl 4 in the operating lever 1 is formed by the use of any known press work by raising a corresponding lug protruding into the anchor perforation 3 so as to erect at right angles to the operating lever 1 and the stopper pawl 5 in the operating lever 1 is also formed by the use of any known press work by bending the free end of the operating lever 1 at right angles to the remaining portion of the operating lever 1. On the other hand, the support bench 15 used to support the player mechanism 2 has the corresponding shaping weir 22 which, when the operating button 6 is mounted on the operating lever 1, confronts the stopper edge 3a of the anchor perforation 3 and which cooperates with the edge 3a to define the anchor peg 17 therebetween upon application of the pulsating pressure to that area 8 of the top wall of the mounting tongue 13. Because of these reasons, it is possible to employ the anchor perforation 3 of a relatively large size enough to facilitate the raise of the lug to form the stopper pawl 4 and, at the same time, the anchor peg 17 can assuredly be formed by the shaping weir 2 then cooperating with the edge 3a of the anchor perforation 3.

If the pulsating pressure of not higher than 20 kHz and an amplitude of not greater than 15 μm is applied to that area 8 of the top wall of the mounting tongue 13 through the presser 16, the resin component at that area 8 of the top wall of the mounting tongue 13 can be substantially half-fused to protrude that resin component in a direction conforming to the direction of application of the pulsating pressure and, therefore, the anchor peg 17 can advantageously be formed.

Also, if the amount of the resin component that protrudes into the space within the anchor perforation 3 to eventually form the anchor peg 17 is determined depending on the preset magnitude of the pulsating pressure and the length of time of application of such pulsating pressure with no stopper provided forcibly in the direction of application of the pulsating pressure during the application thereof to the area 8 in the mounting tongue 13 through the presser 16, the anchor peg 17 can be formed to such a size as determined by the pressure applied from the presser 16 and the length of time of application of the pulsating pressure through the presser 16.

Although the present invention has been described in connection with the preferred embodiment thereof with reference to the accompanying drawings, it is to be noted that various changes and modifications are apparent to those skilled in the art. By way of example, although in the illustrated embodiment reference has been made to the use of the positioning hole 10 in each of the operating lever and of the corresponding positioning pin 18 on the support bench 15, they may not be always essential and a positioning recess may alternatively be formed on the support bench 15 in a shape complementary to the shape of each operating lever 1. Also, not only may one of the stoppers 4 and 5 be dispensed with, but the stopper pawl or pawls may be formed on side edges of each operating lever 1.

Accordingly, such changes and modifications are to be understood as included within the scope of the present invention as defined by the appended claims, unless they depart therefrom.

What is claimed is:

1. A method of securing an operating button, made of thermoplastic resin, to an operating lever in the form of an elongated metal plate, said operating button including a mounting tongue of a generally tubular configuration having a hollow defined therein, said method comprising the steps of:

forming an anchor perforation and a stopper pawl in said operating lever;

temporarily mounting the operating button on the operating lever with said operating lever slid into the hollow of the mounting tongue until an abutment defined in the mounting tongue and positioned within the hollow is brought into engagement with the stopper pawl;

while the operating button is thus temporarily mounted on the operating lever, placing the operating lever on a support bench with one of opposite surfaces of said operating lever held in contact with the support bench; and applying a pressure to an area of the mounting tongue which is substantially aligned with the anchor perforation by means of a presser to thereby form an anchor peg protruding into the anchor perforation in the operating lever.

2. The method as claimed in claim 1, wherein said presser is in the form of a generally cylindrical horn having a free end shaped to represent a generally semispherical shape.

3. The method as claimed in claim 2, wherein said area of the mounting tongue to which the pressure is applied is defined at a location substantially aligned with the anchor perforation, but offset a predetermined distance towards a free end of the operating lever and wherein said presser is, during the application of the pressure, vibrated at a high frequency and a minute amplitude.

4. The method as claimed in claim 2, wherein during the application of the pressure to the area of the mounting tongue the other of the opposite surfaces of the operating lever is held in contact with a surface region of the mounting tongue aligned with that area to which the pressure is applied and, at the same time, the operating button is retained by a backup element in position as temporarily mounted on the operating lever with the abutment held in engagement with the stopper pawl.

5. The method as claimed in claim 2, wherein the stopper pawl in the operating lever is formed by raising a corresponding lug protruding into the anchor perforation from an edge remote from the free end of the operating lever so as to extend at right angles to the operating lever, wherein said support bench has a shaping weir formed thereon and adapted to protrude into the anchor perforation when the operating button is mounted on the operating lever, and wherein said anchor peg is formed between the shaping weir on the support bench and an edge opposite to that edge at which the stopper pawl is formed.

6. The method as claimed in claim 2, wherein the presser is vibrated at a frequency not higher than 20 kHz and an amplitude not greater than 15 μm.

7. The method as claimed in claim 2, wherein the anchor peg is of a size determined by the pressure applied from the presser and the length of time of application of the pressure with no stopper provided forcibly in the direction of application of the pulsating pressure during the application thereof to the area of the mounting tongue.

8. The method as claimed in claim 1, wherein said area of the mounting tongue to which the pressure is applied is defined at a location substantially aligned with the anchor perforation, but offset a predetermined distance towards a free end of the operating lever and wherein said presser is, during the application of the pressure, vibrated at a high frequency and a minute amplitude.

9. The method as claimed in claim 8, wherein during the application of the pressure to the area of the mounting tongue the other of the opposite surfaces of the operating lever is held in contact with a surface region of the mounting tongue aligned with that area to which the pressure is applied and, at the same time, the operating button is retained by a backup element in position as temporarily mounted on the operating lever with the abutment held in engagement with the stopper pawl.

10. The method as claimed in claim 8, wherein the stopper pawl in the operating lever is formed by raising a corresponding lug protruding into the anchor perforation from an edge remote from the free end of the operating lever so as to extend at right angles to the operating lever, wherein said support bench has a shaping weir formed thereon and adapted to protrude into the anchor perforation when the operating button is mounted on the operating lever, and wherein said anchor peg is formed between the shaping weir on the support bench and an edge opposite to that edge at which the stopper pawl is formed.

11. The method as claimed in claim 8, wherein the presser is vibrated at a frequency not higher than 20 kHz and an amplitude not greater than 15 μm.

12. The method as claimed in claim 8, wherein the anchor peg is of a size determined by the pressure applied from the presser and the length of time of application of the pressure with no stopper provided forcibly in the direction of application of the pulsating pressure during the application thereof to the area of the mounting tongue.

13. The method as claimed in claim 1, wherein during the application of the pressure to the area of the mounting tongue the other of the opposite surfaces of the operating lever is held in contact with a surface region of the mounting tongue aligned with that area to which the pressure is applied and, at the same time, the operating button is retained by a backup element in position as temporarily mounted on the operating lever with the abutment held in engagement with the stopper pawl.

14. The method as claimed in claim 13, wherein the stopper pawl in the operating lever is formed by raising a corresponding lug protruding into the anchor perforation from an edge remote from the free end of the operating lever so as to extend at right angles to the operating lever, wherein said support bench has a shaping weir formed thereon and adapted to protrude into the anchor perforation when the operating button is mounted on the operating lever, and wherein said anchor peg is formed between the shaping weir on the support bench and an edge opposite to that edge at which the stopper pawl is formed.

15. The method as claimed in claim 13, wherein the presser is vibrated at a frequency not higher than 20 kHz and an amplitude not greater than 15 µm.

16. The method as claimed in claim 13, wherein the anchor peg is of a size determined by the pressure applied from the presser and the length of time of application of the pressure with no stopper provided forcibly in the direction of application of the pulsating pressure during the application thereof to the area of the mounting tongue.

17. The method as claimed in claim 1, wherein the stopper pawl in the operating lever is formed by raising a corresponding lug protruding into the anchor perforation from an edge remote from the free end of the operating lever so as to extend at right angles to the operating lever, wherein said support bench has a shaping weir formed thereon and adapted to protrude into the anchor perforation when the operating button is mounted on the operating lever, and wherein said anchor peg is formed between the shaping weir on the support bench and an edge opposite to that edge at which the stopper pawl is formed.

18. The method as claimed in claim 17, wherein the presser is vibrated at a frequency not higher than 20 kHz and an amplitude not greater than 15 µm.

19. The method as claimed in claim 17, wherein the anchor peg is of a size determined by the pressure applied from the presser and the length of time of application of the pressure with no stopper provided forcibly in the direction of application of the pulsating pressure during the application thereof to the area of the mounting tongue.

20. The method as claimed in claim 1, wherein the presser is vibrated at a frequency not higher than 20 kHz and an amplitude not greater than 15 µm.

21. The method as claimed in claim 20, wherein the anchor peg is of a size determined by the pressure applied from the presser and the length of time of application of the pressure with no stopper provided forcibly in the direction of application of the pulsating pressure during the application thereof to the area of the mounting tongue.

22. The method as claimed in claim 1, wherein the anchor peg is of a size determined by the pressure applied from the presser and the length of time of application of the pressure with no stopper provided forcibly in the direction of application of the pulsating pressure during the application thereof to the area of the mounting tongue.

\* \* \* \* \*